Sept. 25, 1956 W. SHOCKLEY 2,764,642

SEMICONDUCTOR SIGNAL TRANSLATING DEVICES

Filed Oct. 31, 1952

INVENTOR
W. SHOCKLEY
BY
ATTORNEY

United States Patent Office 2,764,642

Patented Sept. 25, 1956

2,764,642

SEMICONDUCTOR SIGNAL TRANSLATING DEVICES

William Shockley, Madison, N. J., assignor to Bell Telephone Laboratories, Incorporated, New York, N. Y., a corporation of New York Application October 31, 1952, Serial No. 317,883

8 Claims. (Cl. 179—171)

This invention relates to semiconductor signal translating devices and more particularly to such devices of the general class wherein in operation substantial flow of only one type of carriers, electrons or holes, is involved.

Devices of this class are disclosed in the applications Serial No. 243,541, filed August 24, 1951, and Serial No. 276,511, filed March 14, 1952, of W. Shockley and may be referred to conveniently as unipolar transistors. A particular advantageous feature thereof is capability of operation, for example as amplifiers and oscillators, at very high frequencies. The devices comprise, in general, a body of semiconductive material and three connections thereto termed the source, the drain and the gate. Operation entails injection of carriers at the source and flow of these carriers to the drain under control of the gate, analogous to the flow of electrons from the cathode to the anode, under control of a grid, in an electron discharge device. It entails also establishment of a space charge region between the source and drain, as by, for example, reverse biasing of a pair of adjacent PN junctions in or adjacent the path of flow of carriers from source to drain.

A particularly important parameter in the construction of unipolar transistors is the distance between or spacing of the source and drain or more generally, the dimensions of the semiconductive body at which the space charge region is to be established. In general, these dimensions should be very small, say of the order of $3\times10^{-3}$ centimeters to enable attainment of space charge regions of the requisite and desired extent with the use of relatively small biasing voltages, and of high fields at this region.

Further, it has been found that in some unipolar translating devices, the operating characteristics depart from those prescribed and are subject to change. This, it has been determined, is attributable to surface charges, which may vary in an irregular manner with time.

One object of this invention is to facilitate the fabrication of unipolar signal translating devices.

Another object of this invention is to improve the operating characteristics of such devices and more particularly to minimize or eliminate random or irregular variations therein.

In one illustrative embodiment of this invention, a semiconductor amplifier comprises a bar or wafer of semiconductive material, for example germanium or silicon, having a portion of reduced and small thickness between opposite major faces thereof. The bulk of the body is of one conductivity type and the regions adjacent the portion noted are constructed or treated to provide juxtaposed zones of the opposite conductivity type. Source and drain connections are made to the two zones respectively and a gate connection is made to the bar or wafer remote from these zones.

In operation of the amplifier, both the source and drain are biased relative to the gate so that the two PN junctions are operating in the reverse or high resistance direction, the bias on the drain being substantially higher than that of the source. Input signals are impressed between the source and gate and amplified replicas of these signals are obtained in a load circuit connected between the drain and gate.

By virtue of the reverse biases on the two PN junctions, a space charge region is established which bridges the space between the source and drain zones. Majority carriers from the source zone are injected into this space charge region and flow to the drain. The area over which injection occurs and the magnitude of the carrier current are controlled by the input signals.

It is to be noted that in contradistinction to prior devices, in that above described the mobile carriers are of the same polarity as that of the chemical charge density extant in the region between the source and drain zones. For example, if these zones are of P conductivity type, the mobile carriers are holes; the material between these zones is of N conductivity type and, hence, contains an execess of donors.

Further, it will be noted that by virtue of the construction, the space between the drain and source zones may be made small readily and accurately controlled.

Finally, it will be noted that the paths of the carrier flow from source to drain are remote from the surfaces of the semiconductive body so that surface charges and variations therein do not substantially affect the operating characteristics of the device.

The invention and the above noted and other features thereof will be understood more clearly and fully from the following detailed description with reference to the accompanying drawing, in which.

Figure 1:
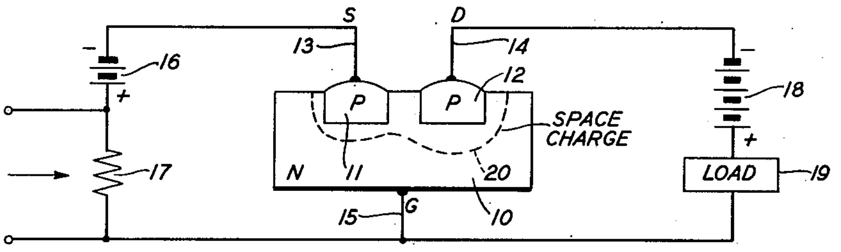
Fig. 1 is a diagram illustrating the principal components and the association thereof in a signal translating device constructed in accordance with this invention.

In the drawing, to facilitate ready understanding thereof, the source, drain and gate have been designated by the letters S, D and G respectively. Also, the conductivity types of the zones or regions in the semiconductinve body have been indicated by the respective letter N or P.

Referring now to the drawing, the amplifier portrayed in Fig. 1 comprises a body of semiconductive material, for example germanium or silicon, the bulk 10 of which is of one conductivity type, for example of N conductivity type as indicated. The body includes also a pair of closely adjacent zones or regions 11 and 12 of the opposite conductivity type, for example P type as indicated. The zones 11 and 12 may be produced by diffusion of appropriate significant impurities into the body or alloying of such impurities with the body. For example, if the bulk 10 is of N type, an acceptor impurity such as indium may be placed upon one surface of the body and the assembly heated to effect fusion of the acceptor with the semiconductor thereby to form the P zones 11 and 12. If the bulk of the body is of P type, a donor impurity such as antimony may be introduced into the body thereby to produce N type zones similar to 11 and 12.

Ohmic source and drain connections 13 and 14 are made to the zones 11 and 12 respectively and an ohmic gate connection 15 is made to the bulk 10, for example by way of a metal coating on the opposite face of the semiconductive body. The PN junctions between the bulk 10 and the zones 11 and 12 are biased in the reverse direction, the bias upon the drain zone being substantially greater than that upon the source zone 11. Specifically, the source may be biased by a battery 16 in series with an input resistor 17; the drain may be biased by a battery 18 in series with a load 19.

Because of the reverse biases of the two junctions, a space charge region is established adjacent thereto, the boundary of this region being indicated by the broken line 20 of Fig. 1. As there depicted, the space charge region is of lesser extent adjacent the source zone 11 than adjacent the drain zone 12, because of the higher bias upon the latter. Majority carriers, holes in the particular embodiment depicted, are injected into the space charge region from the source zone 11 and flow to the drain zone 12. The extent of the space charge region and, hence, the effective area over which injection of these carriers obtains is dependent upon the potential of the source. Also the injection is dependent upon the potential. Thus, as this potential is varied in accordance with signals impressed across the input resistor 17, the current to the drain, and hence to the load, is varied correspondingly. The action is such that the load currents may be produced in a higher impedance than at the input so that although the source and drain currents are substantially equal, power gain will be obtained.

It will be noted that the carriers flowing from source to drain are of the same polarity as that of the chemical charge density of the semiconductive material between the source and drain zones 11 and 12 respectively. It will be noted further that the source and drain zones may be very closely spaced. Thus, high frequency response is attained and operation at relatively low voltage is enabled.

In an illustrative construction, the semiconductive body may be of N conductivity type germanium with resistivity of 20 ohm centimeters and in the form of a bar 1 millimeter by 0.5 millimeter by 2 millimeters. The zones 11 and 12 may be spaced about $3 \times 10^{-3}$ centimeters. Suitable biases upon the source and drain, relative to the gate are 5 volts and 30 volts respectively.

Figures 2, 3, 4, 5, 6, 7:
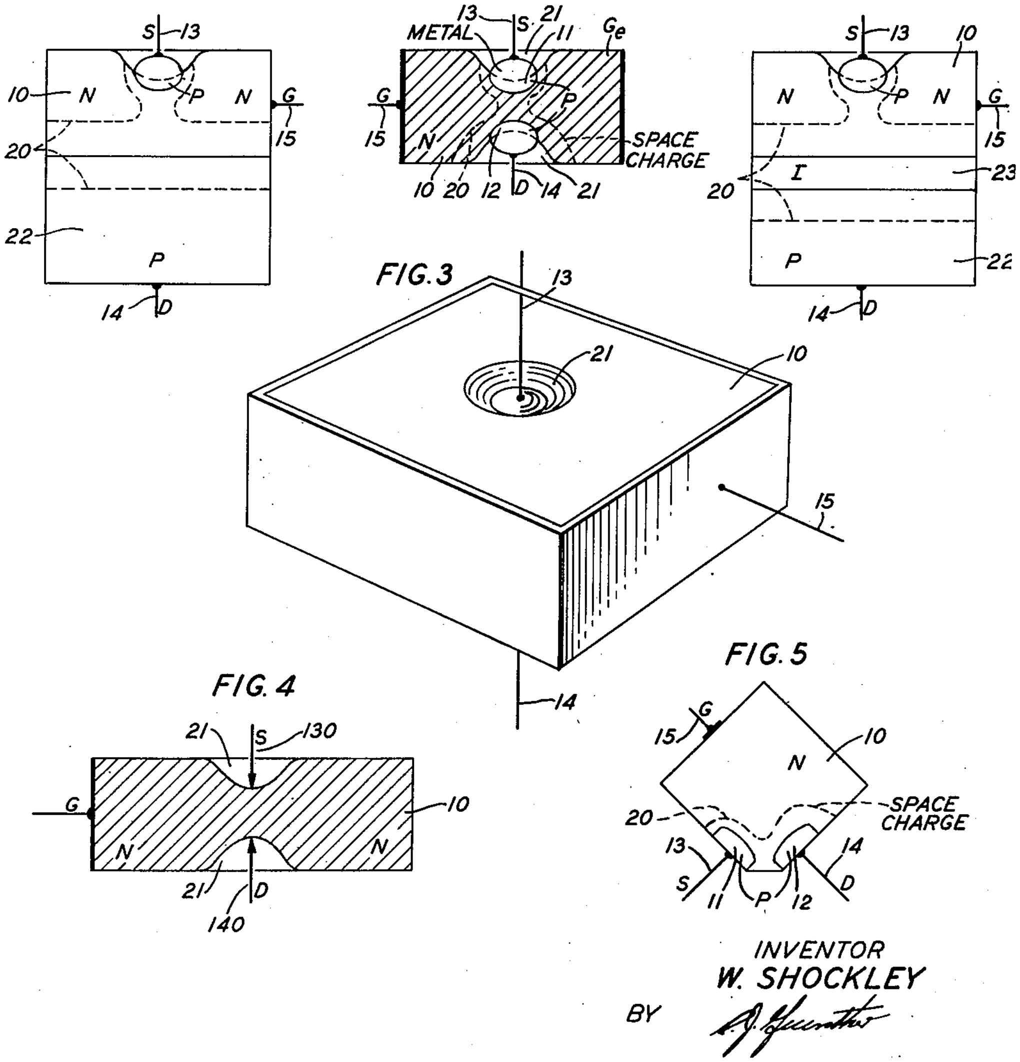
Figs. 2 and 3 are sectional and perspective views respectively of the semiconductive element and associated contacts, illustrative of one embodiment of this invention.
Fig. 4 depicts another embodiment of this invention including point contacts.
Fig. 5 is a top view of a semiconductive element illustrative of another embodiment of this invention.
Figs. 6 and 7 illustrate modifications of the embodiment depicted in Figs. 2 and 3.

In the embodiment of this invention depicted in Figs. 2 and 3, the semiconductive body is in the form of a wafer having aligned depressions 21 in opposite faces thereof. The portions of the body adjacent the bases of these depressions are treated, as in the manners heretofore described, to provide source and drain zones 11 and 12 of conductivity type opposite that of the bulk 10 of the body. Source, drain and gate connections, 13, 14 and 15 respectively, like those in the embodiment illustrated in Fig. 1 are provided as shown.

The device represented in Figs. 2 and 3 is operated in the same manner as that illustrated in Fig. 1 and as described hereinabove. By virtue of the reverse biases upon the source and drain a space charge region is established which bridges the space between the zones 11 and 12. The current, constituted by holes in the specific case portrayed, from the source to the drain is controlled in accordance with signals applied between the source and gate.

It is to be noted particularly that in the embodiment illustrated in Figs. 2 and 3, the carrier flow is entirely within the body, remote from the surfaces of the semiconductor. Thus, surface effects are substantially eliminated and stable, reproducible operating characteristics are attained.

In a typical device of the construction shown in Figs. 2 and 3, the semiconductive wafer may be 0.025 centimeter thick and the zones 11 and 12 spaced 0.001 centimeter.

The invention may be embodied also in point contact devices, one such being illustrated in Fig. 4. It comprises a semiconductive wafer of one conductivity type having aligned depressions 21 in opposite faces thereof and a pair of point contacts 130 and 140, constituting the source and drain connections respectively, centrally positioned each in a respective depression and bearing against the base thereof. A gate connection 15 is made to the body as shown. The point contacts define rectifying junctions with the semiconductive body and when these are biased in the reverse direction as in the embodiments shown in Figs. 1, 2 and 3 a space charge region bridging the material between the contacts is established. Variation in the source-gate potential in accordance with signal effects corresponding variation in the load current to the drain as in the embodiments described hereinabove.

In the embodiment of this invention illustrated in Fig. 5, the semiconductive body is of polygonal configuration and the source and drain zones 11 and 12 are produced in adjacent sides thereof. For example, a P region in an N type body may be produced at one corner portion of the body as in the manner described heretofore in connection with Fig. 1 and the corner ground away to produce two closely adjacent P zones as portrayed in Fig. 5. Source and drain connections are made to these zones and a gate connection is made to the bulk of the body. The operation of the device illustrated in Fig. 5 is the same as that of the other embodiments described priorly herein.

Fig. 6 illustrates an embodiment in which the drain connection is made to a P–N junction such as is grown in a single crystal, as disclosed for example in the application Serial No. 168,184, filed June 15, 1950, of G. K. Teal, now Patent 2,727,840, issued December 20, 1955. The junction is defined by the bulk 10 and a zone 22 of opposite conductivity type. It is preferable to use such a junction for the drain rather than the source since the higher reverse bias between gate and drain results in smaller capacity per unit area at the drain side. By using a junction with a gradual transition region or even a layer of intrinsic material, as shown at 23 in Fig. 7, still smaller capacities can be obtained.

Although in the several embodiments specifically described the bulk of the body is of N conductivity type and the source and drain zones of P type, it will be understood, of course, that the invention may be embodied in devices wherein the reverse is true, i. e., the source and drain zones are of N type and the bulk of the body is P type. Also, it will be understood that the several embodiments are but illustrative and that various modifications may be made therein without departing from the scope and spirit of this invention.

What is claimed is:

1. A signal translating device comprising a body of semiconductive material, elements at opposite faces of said body defining a pair of juxtaposed rectifying junctions therewith, a gate connection to said body remote from said junctions, means biasing both said junctions in the reverse direction, one at a substantially higher potential than the other, an output circuit connected between said gate connection and the element associated with said one junction, and an input circuit connected between said gate connection and the other of said elements.

2. A signal translating device comprising a body of semiconductive material having therein a pair of juxtaposed closely adjacent zones of one conductivity type, the bulk of said body being of the opposite conductivity type, source and drain connections to said zones respectively, a gate connection to the bulk of said body, an input circuit connected between said source and gate and including means biasing the source zone of the polarity opposite that of the majority electrical carriers therein, and an output circuit connected between said gate and drain and including means biasing said drain at a potential of said polarity and greater than the bias on said source, said biases being such that a space charge region bridges the space between said zones.

3. A signal translating device in accordance with claim 2 wherein said material is germanium and said zones are of P conductivity type.

4. A signal translating device in accordance with claim 2 wherein said material is germanium and said zones are of N conductivity type.

5. A signal translating device comprising a body of semiconductive material having a pair of opposed depressions therein, means at the base of each depression defining a rectifying junction with the bulk of said body, a connection to said bulk at a region spaced from said depressions, an input circuit connected between one of said means and said connection and including means biasing the associated junction in the reverse direction, and an output circuit connected between the other of said means and said connection and including means biasing the associated junction in the reverse direction and at a potential higher than said first junction.

6. A signal translating device in accordance with claim 5 wherein said junction defining means comprises a pair of point contacts each engaging the base of a respective one of said depressions.

7. A signal translating device comprising a wafer of semiconductive material having a pair of opposed depressions in the major faces thereof, the bulk of said body being of one conductivity type and said body having therein at said depressions a pair of zones of the opposite conductivity type, individual substantially ohmic source and drain connections to said zones respectively, a substantially ohmic gate connection to said body at a region remote from said zones, means biasing each of said zones at a potential relative to said gate of the polarity opposite that of the majority carriers in said zones, an input circuit connected to said gate, and an output circuit connected to said drain.

8. A signal translating device comprising a semiconductive body having therein a pair of closely spaced outer zones of one conductivity type defining a pair of junctions with an intermediate zone of the opposite conductivity type, source and drain connections to said outer zones respectively, a gate connection to said intermediate zone, means establishing in said body a space charge region extending through said intermediate zone including means biasing both said junctions in the reverse direction, the bias on the junction associated with said drain connection being substantially greater than that upon the junction associated with said source connection, means for varying the potential across one of said junctions, and a utilization circuit connected across the other of said junctions.

References Cited in the file of this patent

UNITED STATES PATENTS

| | | |
|---|---|---|
| 2,563,503 | Wallace | Aug. 7, 1951 |
| 2,570,978 | Pfann | Oct. 9, 1951 |
| 2,586,080 | Pfann | Feb. 19, 1952 |
| 2,600,500 | Haynes et al. | June 17, 1952 |
| 2,652,460 | Wallace | Sept. 15, 1953 |